Feb. 10, 1942.  C. W. SLOCUM ET AL  2,272,977
CONTROL SYSTEM
Filed June 15, 1940
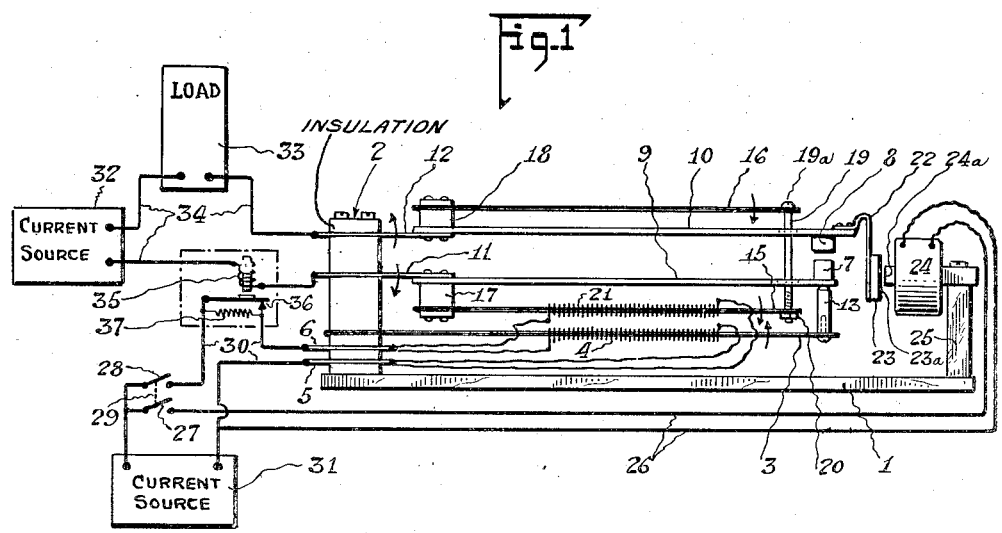
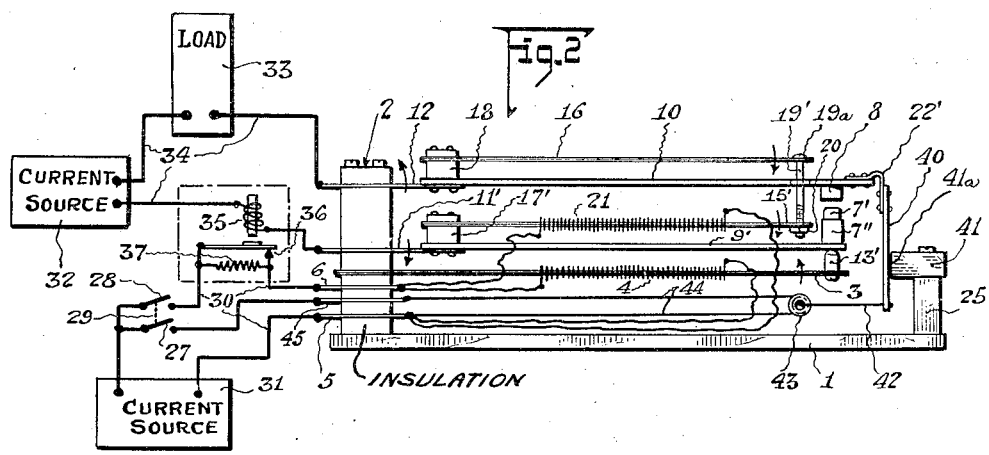
Inventors
Charles W. Slocum
Charles T. Jacobs
By Henry Lanahan
Attorney Patented Feb. 10, 1942

2,272,977

UNITED STATES PATENT OFFICE 2,272,977

CONTROL SYSTEM

Charles W. Slocum, New York, N. Y., and Charles T. Jacobs, New Providence Township, Union County, N. J., assignors to Thomas A. Edison, Incorporated, West Orange, N. J., a corporation of New Jersey Application June 15, 1940, Serial No. 340,660

18 Claims. (Cl. 200—122)

This invention relates to control systems, and in many of its principal aspects to such systems of the time-delay type—e. g., adapted to perform or complete a controlling function at the expiration of a predetermined interval of delay following an initial energization or manipulation of the system.

In the co-pending applications of Charles T. Jacobs, Serial No. 336,873 (filed May 23, 1940, as a continuation in part of a prior application Serial No. 128,219, filed February 27, 1937), and of Charles D. Geer, Serial No. 336,894 (filed May 24, 1940), both assigned to the assignee of this application, there have been disclosed and claimed control systems of the type abovementioned which include as an operating element an energy-storing device (for example, a thermal element) and which, in their operation for a second or succeeding time (i. e., in their "recycling") just as soon as desired after a prior use or incompleted use, served to perform their controlling function with substantially the same interval of delay as when first operated after a relatively long period of disuse. It is an object of the instant invention to provide improvements in the systems and devices disclosed in the abovementioned co-pending applications.

In one aspect the systems disclosed in those applications involved, as a control device to be operated, relatively movable control members which, upon any de-energization of the system, were at least substantially immediately restored to a predetermined mutual relationship, so that a subsequent energization of the system, however soon indulged in, found the system in predetermined condition. In one of its important aspects the instant invention contemplates such a restoration of the control members to predetermined mutual relationship, but has for an object an improvement in the predetermination of that relationship, whereby the independence of the delay interval from the past history of operation of the system is still further enhanced.

In general, the systems disclosed in the co-pending applications abovementioned were fully compensated for variations in ambient temperature, and were largely compensated for variations in the over-ambient temperature which their operating element or elements might assume from time to time. An object of the instant invention is to provide a system, and improvements which render the system, not only fully compensated for ambient temperature variations, but at the same time still more largely or even fully compensated for the variations in over- ambient temperature of the operating elements.

Elaborations of the above-stated objects, and other and allied objects, will become apparent from the following description and the appended claims.

In the description reference is had to the accompanying drawing, in which:

Figure 1 is an elevational view of a control device, and a schematic view of typical further components which with the control device make up a control system, embodying our invention in one typical form; and Figure 2 is a similar view of a control device and system embodying our invention in a modified and further typical form.

Figure 1 illustrates a typical embodiment of the instant invention. Herein will be seen a base 1, at the lefthand end of which is provided the upwardly extending stack 2 of insulating blocks. In the stack 2, at a distance above the base 1, is clamped the lefthand extremity of a bimetallic arm 3, which as usual may be formed of two metals of dissimilar thermal coefficients of expansion. It will be understood that this element will bend arcuately as its temperature is raised, and in the illustrated embodiment this bending is intended to be upward at the free extremity of the arm, as indicated by the arrow therethrough. Broadly, of course, this arm is an energy-storing, or more specifically a thermal, device, adapted to move in accordance with changes of its energy content or temperature. When the arm is at a temperature above the ambient temperature, a downward change of its temperature of course tends to occur by virtue of heat losses (radiation, convection, conduction) from the arm. As a non-limitative means for effecting an upward change of energy content or temperature, there has been illustrated as wound about the arm 3 a heater winding 4 through which an electric current may be passed. The terminals of the winding 4 may conveniently be connected to lugs 5 and 6 provided in the stack 2 below the arm 3.

The bimetallic arm 3 is employed for moving one of two control members forming a control device to be operated. In the illustrated embodiment of the invention this control device may comprise a pair of switch contacts 7 and 8, typically spaced from each other normally and intended to be closed against each other to complete the control device operation. Contact 7 may be carried on top of the righthand extremity of an arm 9 disposed at a distance above the bimetallic arm 3, while contact 8 may be carried, above contact 7, on the bottom of the righthand extremity of an arm 10 in turn disposed at a distance above arm 9. The arms 9 and 10 may each within itself be relatively rigid; but they are effectively "hinged" to the stack 2 by respective leaf springs 11 and 12 secured to the respective lefthand arm extremities and extending leftwardly therefrom to be clamped in the stack 2. The bimetallic arm 3 may be rendered effective on the contact 7 through a spacer rod or post 13 extending upwardly from the free extremity of the bimetallic arm 3 into abutment against the bottom of the arm 9; constancy of this abutment may be maintained by a downward biasing action of spring 11 on arm 9, as indicated by the arrow through that spring. In addition to their supporting functions, it will of course be understood that the springs 11 and 12 may form electrical terminals for the contacts 7 and 8, respectively.

The arm 10 is normally maintained in a predetermined relationship to arm 9, and contact 8 thereby in a predetermined relationship to contact 7. The structure by which this is done in the illustrated embodiment comprises a bimetallic arm 15 disposed spacedly below the arm 9 and having its lefthand extremity insulatedly clamped to the lefthand extremity of that arm, as through the small insulating stack 17; a bimetallic arm 16 disposed spacedly above the arm 10 and having its lefthand extremity insulatedly clamped to the lefthand extremity of that arm, as through the small insulating stack 18; and a tie rod or screw 19, having a head 19a resting on top of bimetallic arm 16 near the free extremity of the latter, and passing downwardly through clearance holes in 16, 10, 9 and 15 to carry an axially adjustable nut 20 below the bimetallic arm 15. An upward biasing action of spring 12 on arm 10 and therethrough on bimetallic arm 16, indicated by the arrow through that spring, normally urges the elements 10—16 away from the elements 9—15, to the limit permitted by the tie-screw 19 and nut 20. The normal relationship may for example be such as appears in the drawing, contacts 7 and 8 occupying such a spaced relationship as is indicated. Both bimetallic arms 15 and 16 will of course bend arcuately with increase of their energy contents or temperatures; and in the illustrated embodiment this bending is intended to be downwardly at the free extremity of each, as indicated by the respective arrows in the drawing. The two bimetallic arms 15 and 16 may have characteristics similar to each other; the relationship of their characteristics to those of the bimetallic arm 3, however, are hereinafter considered.

It may be noted that in the illustrated embodiment there is contemplated a continual touching of the top of rod 13 by the bottom of arm 9. In establishing the relative biasing actions of springs 11 and 12, that of spring 11 (a downward bias) will be made sufficiently predominate to insure this continual touching.

A heater winding 21 has been illustrated about the bimetallic arm 15, for purposes which will hereinafter be explained. It may be noted, however, that if both the bimetallic arms 15 and 16 were always maintained at the same temperature, then no matter how that common temperature might vary, their bendings would always be exactly similar and the spacing of 9 from 10 (and of 7 from 8) would not be varied. In other words, the effect of the structure

15—16—17—18—19—20 just described would be simply that of an insulating limiting tie between the arms 9 and 10. It will be convenient to assume this condition throughout a further portion of the description, until attention is specifically re-directed to the actions of these two bimetallic arms 15 and 16.

In the absence of further structure, it will be apparent that the variation of the energy content or temperature of the main bimetallic arm 3 would be of no effect on the control device 7—8— for up-and-down movements of the bimetallic arm 3 and rod 13 would only serve to uniformly raise and lower both 7 and 8. As disclosed in the co-pending applications, however, the means which normally maintain 7 and 8 in predetermined relationship to each other may be rendered inoperative at times—typically simultaneously or concomitantly with the supply of energy to the bimetallic arm 3. Further as disclosed in those applications, this effect may for example be achieved by rendering stationary the upper contact 8, as by coupling the arm 10 to a stationary object.

A means for such coupling has been illustrated in Figure 1 as comprising a leaf spring 22 secured to the free extremity of arm 10 and for example curved first upwardly and then reversely to extend for a distance downwardly; an armature 23 of magnetic material secured to the outer surface of the downwardly extending part of spring 22; and an electromagnet 24, mounted on a standard 25 extending upwardly from the righthand extremity of base 1, and having its pole end 24a positioned opposite to, and very slightly spaced from the normal position of, the outer surface 23a of the armature 23. The electrical terminals of the electromagnet 24 may be connected as by leads 26 to current source 31, through a switch 27. The lugs 5 and 6 (through which current may be supplied to heater winding 4 about bimetallic arm 3) may be connected as by leads 30 to the same source 31, through a switch 28. For the preferredly contemplated case of concomitant coupling of arm 10 and energy supply to bimetallic arm 3, the switches 27 and 28 may be arranged for simultaneous operation, as indicated in the drawing by the tie 29 therebetween.

It will be understood that upon closure of the switches 27 and 28, there will occur a concomitant energization of the electromagnet 24 and supply of energy to the bimetallic arm 3 (i. e., energization of the electro-thermal device formed by that arm and its associated winding 4). The armature 23 will be attracted into intimate contact with the pole end 24a, and its frictional contact therewith will prevent the upward movement of spring 22 and arm 10 and contact 8 which would otherwise accompany a rise of the bimetallic arm 3. Meanwhile such a rise of that arm occurs in response to its heating and, at the rate predetermined by the parameters of and conditions within the system, will carry the contact 7 toward and into contact with the contact 8.

The control members 7 and 8, which normally (or when the electromagnet 24 is not energized) move jointly with each other, may be occupying any absolute mean elevation in response to the then-occupied position of bimetallic arm 3, when the switches 27 and 28 are closed—the armature 23 being vertically elongated to insure a portion of its face 23a being opposite the electromagnet pole end 24a under any practical conditions.

When the switch 27 is opened (for example simultaneously with the opening of switch 28)— whether that opening occurs before, with or after closing of the contacts 7 and 8—the armature 23 and spring 22 will be released by the electromagnet 24, and the predetermined relationship of the contacts 7 and 8 will be instantaneously restored under the influence of spring 12. However soon the switches 27 and 28 may be re-closed, the armature 23 will simply be attracted to the pole end 24a in a fresh position; and the operation of the system will be repeated, again starting with the contacts 7 and 8 in their predetermined relationship, as described for an initial operation.

It will of course be understood, in view of the just-described action, that the system is automatically compensated for variations in the temperature of its environment, or ambient temperature, and that this compensation is in addition to its other features of improved action over that of conventional systems.

The operation of the control device 7—8, or closure of the normally open switch which that device comprises in the illustrated embodiment, may be utilized for any desired purpose and in any desired manner. Purely by way of example there have been illustrated, connected in series with the terminals (springs) 11 and 12 for that device, through conductors 34, a current source 32 and load 33—that load accordingly being supplied with current from that source through the control device 7—8 at the expiration of the delay interval following closure of the switches 27 and 28.

The operation of the system as that operation has been so far described (presented, as abovementioned, with the assumption that the bimetallic arms 15 and 16 are maintained at some common temperature and thus of no operative significance) is typical of that of the disclosures of the copending applications abovementioned.

Before proceeding to a detailed consideration of the principal feature of the instant invention, it may be mentioned that no unexpressed limitation is intended as to functions of the system subsequent to operation (e. g., closure) of the control device 7—8 and prior to re-opening of switches 27 and 28. There may be mentioned, however, as an example of a possibly desired function, the continued supply of load 33 with current from source 32 throughout the continued closure of switches 27 and 28. Under these circumstances it may be desirable to reduce the rate of current supply to the winding 4, which now needs only to overcome losses in order to maintain the bimetallic arm 3 raised for continued closure of 7 and 8, to a value somewhat less than that employed for initially raising that arm. This may for example be done by inserting in one of the conductors 34 the winding of a relay 35, which upon energization by closure of circuit 32—33—34—11—12 will open a switch 36 normally short-circuiting a resistance 37 serially inserted in one of the conductors 30.

As pointed out in the co-pending applications abovementioned, the operations of systems of this improved type, even very quickly repeated after prior operations or incomplete operations, tend to be characterized by a uniform delay interval—in distinction to the operations of wholly conventional systems, in which, by reason of lack of compensation for finite and slow loss of energy or heat from the storing or thermal device, the delay interval is sharply reduced in the case of quickly repeated operations. In a great number of practical employments of the improved systems, the deviations from uniformity of delay interval are entirely minor and quite inconsequential. There are, however, instances wherein the operating conditions are sufficiently severe—by way, for example, of number of desired re-cyclings and rapidity with which they follow each other—to render quite appreciable in magnitude deviations otherwise of inconsequential magnitude. A principal aspect of the instant invention is directed to the reduction or elimination of these deviations.

To understand these deviations it is helpful to resort to a simple approximate mathematical representation of the spacing $S_t$ between the contacts (e. g., 7 and 8) at $t$ seconds after the beginning of an operation. Such a representation is readily arrived at on the approximately correct assumption that the losses from the storing or thermal device (e. g., 3) increase in direct proportion to the excess of its temperature over ambient; and on the corrollary that when energy is supplied to that device at a uniform rate (as by a steady current flow through winding 4) the displacement of the device (e. g., reckoned at contact 7) from its initial position, plotted against time, is an exponential function which asymptotically approaches some limiting or "saturation" displacement D. If $S_0$ is the normal separation of the contacts (automatically assured, as above explained, at the start of each operation), $e$ the base of natural or Naperian logarithms, and P a thermal constant for the storing or thermal device, then, for the case of the device 3 being at ambient temperature at the beginning of the operation:

$$S_t = S_0 - D(1-e^{-Pt}) \qquad (1)$$

It will be understood that while this expression assumes that arm 3 is at ambient temperature at the beginning of the operation, the absolute value of that ambient is of no consequence. Now for closure of the contacts $S_t$ must just have become zero. Equating Expression 1 to zero and solving for $t$, it is found that:

$$t_c = \frac{1}{P} \log\left(\frac{1}{1-\frac{S_o}{D}}\right) \qquad (2)$$

which shows the time $t_c$ for contact closure to depend only on fixed parameters.

But when at the start of operation of the system the arm 3 is not at ambient temperature, but instead is hotter by reason of incomplete loss of its heat from some prior operation or operations, the foregoing expressions do not hold. The exponent of $e$ must now reflect in some way the initial condition of over-ambient temperature. A convenient way in which to make it do this is to assume a variable $v$ as the number of seconds of a theoretical operation, immediately prior to the actual operation, required to have brought the arm 3 from ambient temperature up to its actual temperature; then the exponent of $e$ would become $-P(v+t)$. Now this would render the last term of Expression 1 finite, instead of zero, when $t$ is zero—yet necessarily the spacing $S_t$ then equals $S_0$, just as in the case of starting with the arm 3 at ambient temperature. It is therefore necessary not only to change the exponent of $e$ as above noted, but also to add a term independent of $t$ but which, when $t$ is zero, will offset the change of exponent. (This term physically represents the upward displacement of contact 8 from the position it would occupy if arm 3 were at ambient temperature.) The expression, for the case of the arm 3 being at over-ambient temperature at the beginning of the operation, accordingly becomes:

$$S_t = S_0 - D(1-e^{-P(v+t)}) + D(1-e^{-Pv}) \quad (3)$$

This expression may of course be taken as generic to either over-ambient or ambient starting temperature of the arm ($v$ simply being zero, and the last of the three terms therefore zero, in the later case). Solving this expression for $t$, in the manner indicated above, it is found that $$t_c = \frac{1}{P} \log \left( \frac{1}{1 - e^{Pv}\frac{S_0}{D}} \right) \quad (4)$$

In this expression, though the other quantities are constants, $v$ is of course a variable.

In a great number of cases in which conventional systems would be useless, $v$ (which has been explained above to be an equivalent value—the number of seconds required for energization of the arm 3 to heat it from ambient to its actual starting temperature, assuming that energization to have been immediately prior to the starting) will never be very large, $t_c$ remains reasonably constant for different operations, and the improved systems as described in the co-pending applications abovementioned are quite satisfactory. But in other employments of these systems, $v$ may at times be very large (representing for example a near-saturation displacement of the arm 3 resulting from many quickly repeated operations); and the denominator of the log term in Expression 4 may accordingly reduce toward or reach zero or even become negative, the log itself becoming large or even infinite, and the time required for contact closure thus unduly long or even infinite. In other words, under the more extreme conditions the delay interval is appreciably lengthened, and may even reach the point where no closure occurs at all.

According to the instant invention, this variation of the delay interval with starting temperature of the storing or thermal device 3 is minimized or eliminated by reducing the separation of the contacts 7 and 8 by an amount which increases with the starting temperature of the device 3—in other words, by predetermining the normal relationship (obtaining in between the operations of the system) of those two control members to each other, not at a uniquely fixed value, but inversely (i. e., in an opposite sense) to the excess of the temperature of the device 3 over ambient temperature.

Thus suppose the actual initial separation of the contacts, $S_0$, is not a fixed parameter, but is made to be $S_a$ (their separation when arm 3 is at ambient temperature, and therefore a fixed quantity) times $e^{-Pv}$. Expression 3 then becomes:

$$S_t = S_a e^{-Pv} - D(1-e^{-P(v+t)}) + D(1-e^{-Pv}) \quad (5)$$

which, solved for $t_c$, yields $$t_c = \frac{1}{P} \log \left( \frac{1}{1 - \frac{S_a}{D}} \right) \quad (6)$$

This, excepting for the substitution of the fixed $S_a$ for $S_0$ (which was by hypothesis fixed in Expression 1 above) is identical with Expression 1—all variables, including $v$, being absent.

The quantity by which the separation $S_a$ obtaining at ambient temperature needs to be reduced to obtain the separation $S_a e^{-Pv}$ contemplated in Expression 5 above is of course $S_a(1-e^{-Pv})$. In other words, the contact separation needs to be reduced, below the separation obtaining at ambient, by $S_a/D$ times the initial upward displacement of arm 3 which has been occasioned by its excess over ambient temperature. The fraction $S_a/D$ of course represents the ratio of the ambient separation of the contacts to the saturation displacement of the arm 3.

A reduction of the above-described nature is the function of the structure 15—16—17—18—19—20—21 above described. The bimetallic arm 15, with its winding 21, is arranged, by appropriate choice of its construction, to have an essentially similar constant P to the bimetallic arm 3; further, it and the supply of heat thereto are arranged so that in the operation of the system its self-displacement from ambient-temperature position (reckoned for example at its righthand extremity on the assumption that its lefthand extremity is held fixed) is approximately $S_a/D$ times the self-displacement from ambient-temperature position of the bimetallic arm 3. In turn it follows that $S_a$ (or the separation of the contacts when the bimetallic arms 3 and 15 are at ambient temperature) and the saturation self-displacement of the bimetallic arm 15 (the self-displacement asymptotically approached with an indefinitely continued supply of heat thereto at the normal rate) are desirably approximately equal. Having proportionate responses to energy input and similar energy loss constants, the self-displacements of the bimetallic arms 3 and 15 will always tend to be proportionate—though, as illustrated, opposite in direction.

It will be seen that the more over-ambient are the temperatures of the bimetallic arms 3 and 15, the more the bimetallic arm 15 will be bowed downwardly at its free (righthand) extremity, and the more the bimetallic arm 16 and arm 10—and hence contact 8—will be moved downwardly relative to arm 9 and contact 7, through the influence of the limiting tie 19. But it will be seen that if bimetallic arm 15 were coupled directly to arm 10, its effect on the contact separation would be according to its absolute temperature and absolute self-displacement; in other words, the absolute value of the ambient temperature would have an influence on the compensating action of bimetallic arm 15 and therethrough on the contact separation. It will be understood that what is desired is an influence of the bimetallic arm 15 on the contact separation according to its excess over ambient temperature, or its self-displacement from ambient-temperature position, so that the absolute value of the ambient temperature remains, as originally, of no influence on the operation of the system. It is for this reason that there is provided, in the recited arrangement, the bimetallic arm 16, characterized by a similar displacement-per-degree-temperature-change to that of bimetallic arm 15 but exposed simply to ambient temperature, and that the limiting tie 19 is run to the bimetallic arm 16 rather than to the arm 10; the bimetallic arm 16 then neutralizes so much of the effect of bimetallic arm 15 as is due merely to changes of ambient temperature.

It will of course be understood that in the operation of the system the value of $S_a$ will always be a fraction of that of D, and the saturation displacement of the bimetallic arm 15 a fraction of that of the bimetallic arm 3. In certain cases it may be possible to obtain an approximately correct compensating action, without the heater winding 21 on bimetallic arm 15, simply by reliance on the heating of that arm by radiation, convection, etc., from bimetallic arm 3 with its heater winding 4. In general, however, the use of the winding 21, connected for energization simultaneous with that of winding 4, is preferable. And it will be understood that the bimetallic arm 16 may be omitted (for example, when the ambient temperature is subject to little variation)—the compensation, as above apparent, then being effected according to absolute temperature, rather than according to temperature relative to ambient temperature.

It may also be pointed out that while in most instances of use an approximately correct compensation will be desired, and may be obtained as above indicated, there may be certain instances in which there is desired a definite shift of interval in the case of quickly repeated operations. In wholly conventional systems there is an extreme such shift in a negative direction (shortening the interval), while in the improved systems disclosed in the co-pending applications abovementioned there is some such shift in a positive direction (lengthening the interval). By appropriately proportioning the parameters of the elements in embodying the instant invention, there may be provided a shift of either direction in any desired degree.

It has been pointed out in the co-pending applications abovementioned that while the operation contemplated for the usual case involves the simultaneous supplying of energy to the storing device (e. g., of current to the winding 4 on bimetallic arm 3) and operation of the coupling means, there is contemplated for special cases the use of the system with these functions separately controlled—e. g., in Figure 1 hereof, with the omission of the tie 29 between the switches 27 and 28. In such a case broadly, the final control means will be operated when, during any period of coupling-means operation, the energy supplied to the storing (e. g., electro-thermal) device less any losses therefrom (whether the energy supply be continuous or intermittent) has reached a predetermined value—the switches (e. g., 27 and 28) respectively controlling that operation and that supply being controlled appropriately to the ultimate function for which the system is employed. It is to be understood that broader aspects of the instant invention contemplate such separate control, and that the invention is capable of effecting improved results therewith analogous to those it effects in the case of simultaneous control.

It will of course be understood that while the control device has been illustrated as comprising arms carrying normally open contacts, to be closed at the expiration of the delay interval, this has been done by way of example, and no unexpressed limitation thereto is intended.

The co-pending applications abovementioned have shown several alternative embodiments of their improved systems, to any of which the adaptation of the instant improvements is believed to be made apparent by the foregoing specific example. There has been included as Figure 2 hereof, however, a showing of the instant invention as applied to an alternative one of those embodiments wherein a different mode of coupling means operation is relied on; and in this showing a typical re-arrangement of features of the instant invention has been included.

The alternative coupling means operates electro-thermally, rather than electro-magnetically. Thus spring 22 of Figure 1 is replaced by spring 22' having a shorter downward extension; and secured to this spring, and extending downwardly therefrom, is an arm 40 preferably of metal or other rigid material. For the electromagnet 24 there is substituted a simple block 41 having an inner face 41a against which the arm 40 may come into frictional contact. Spring 22' is biased so that this contact tends to be established. To the bottom of the arm 41, however, there is secured one end of a link 42 to whose other extremity is secured an insulating spool 43; and passing around this spool, and extending to have its ends secured to lug 5 and to an additional lug 45 in stack 2, is provided a fine resistance wire 44. The length of 44—43—42 is chosen so that normally the spring 22' is flexed sufficiently to maintain the arm 40 dependably free of contact with the block face 41a. The wire 44 is connected, however, (through lugs 5 and 45) as was the electromagnet of Figure 1; and upon the supply of current to the wire 44, its expansion resulting from its heating permits the bias of spring 22' to become effective to cause the frictional engagement of arm 40 with the block face 41a. Obviously this engagement acts on arm 10 in an analogous manner to the electromagnetically produced engagement of 23 with 24a in Figure 1—subject to the qualifications that any delay in effecting the engagement, due to the thermal inertia of the wire 44, may serve correspondingly to increase the interval of contact closure, and that an analogous momentary delay may be experienced in the return of the elements to their predetermined positions upon cessation of the clutch-operating current, both of which qualifications are usually quite inconsequential.

The re-arrangement of features of the instant invention in Figure 2 is simply the reversal of positions of arm 9 and bimetallic arm 15 (in view of which their designations have been furnished with prime-marks). This renders arm 9' effective as a heat-shield between bimetallic arms 3 and 15'—which, when a heater winding 21 is employed for the latter, is helpful in maintaining proportionality between the temperatures of those bimetallic arms (by eliminating one-way radiation from the relatively hotter 3 to the relatively cooler 15'). In view of slight re-positioning, different dimension or the like, the spring 11, rod 13, insulating stack 17 and screw 19 have designations furnished with prime-marks in Figure 2. Further, in view of an increased separation of arms 9' and 10 from each other, the contact carried by 9' (7') has been shown supported on a conductive spacing block 7''.

It will be understood that, subject to special remarks already made concerning it, the embodiment of Figure 2 functions in the manner already outlined for that of Figure 1.

While the invention has been illustrated and described with reference to two particular embodiments thereof, it will be understood that the arrangements and other features of those embodiments may be varied within wide limits without necessarily departing from the spirit or scope of the invention, as many modifications will readily suggest themselves to those skilled in the art. The scope of the invention we undertake to express in the appended claims.

We claim:

1. In a control system including coacting movable control members: the combination of means normally effecting movement of a second of said members substantially smaller than but approximately proportionate to that of the first member; an energy-storing device for moving said first member in accordance with change of the energy content of said device; and means operable during change of said energy content for retaining said second member from said proportionate movement.

2. In a control system including coacting movable control members: the combination of means normally effecting movement of a second of said members substantially smaller than but approximately proportionate to that of the first member; means operable to retain said second member from said proportionate movement; and a thermal device whose temperature may be changed while said retaining means is being operated, for moving said first member in accordance with change of the temperature of said device.

3. In a control system including coacting control members: the combination of means normally maintaining said members in predetermined mutual relationship; an energy-storing device adapted to move one of said members in accordance with change of the energy content of said device; coupling means operable during change of said energy content for rendering said maintaining means ineffective; and means included in said maintaining means for causing said mutual relationship to be predetermined in substantial accordance with said energy content.

4. In a control system including coacting control members: the combination of means normally maintaining said members in predetermined mutual relationship; coupling means operable to render said maintaining means ineffective; a thermal device whose temperature may be changed while said coupling means is being operated, for moving one of said members; and means included in said retaining means for causing said mutual relationship to be predetermined in substantial accordance with the temperature of said device.

5. In a control system including control means comprising coacting members: the combination of an energy-storing device whose energy content may be changed and which is adapted for movement in accordance with change of that content; coupling means effective on one of said members and operable to render said control means responsive to said movement of said device; and means, rendered effective by the cessation of operation of said coupling means, for restoring said members to a mutual relationship predetermined in substantial accordance with the energy content of said device.

6. In a control system including control means comprising coacting members: the combination of a thermal device whose temperature may be changed and which is adapted for movement in accordance with change of its temperature; coupling means effective on one of said members and operable to render said control means responsive to said movement of said device; and means, rendered effective by the cessation of operation of said coupling means, for substantially instantaneously restoring said members to a mutual relationship predetermined in substantial accordance with the temperature of said device.

7. In a control system including coacting control members: the combination of electro-thermal moving and electro-mechanical coupling means jointly operable to effect a movement of one of said members in accordance with the movement of said moving means, while the other member is maintained stationary; and means, effective when said coupling means is out of operation, for varying the mutual relationship of said members in substantial accordance with a fraction of the movement of said moving means.

8. In a control system including control means comprising relatively movable members: the combination of means for operating said control means, including a thermally displaceable device for effecting a relative movement of said members in accordance with the device displacement; and means, rendered effective by the cessation of operation of said operating means, for restoring said members approximately to a fixed mutual relationship modified by a fraction of the displacement of said device from its ambient-temperature position.

9. In a control system including control means comprising relatively movable members: the combination of means for operating said control means, including a thermally displaceable device for effecting a relative movement of said members in accordance with the device displacement; and means, effective while said operating means is out of operation, for establishing said members approximately in a fixed mutual relationship modified by a fraction of the displacement of said device from its ambient-temperature position.

10. In a control system including control means comprising relatively movable members: the combination of means for operating said control means, including a thermally displaceable device for effecting a relative movement of said members in accordance with the device displacement; and means, effective at the initiation of operation of said operating means, for establishing said members approximately in a fixed mutual relationship modified by a fraction of the displacement of said device from its ambient-temperature position.

11. In a control system including control means comprising relatively movable members: the combination of means for operating said control means, including a thermally displaceable device for effecting a relative movement of said members; means, effective while said operating means is out of operation, for establishing said members in a predetermined mutual relationship; and a second thermally displaceable device, heated substantially proportionately with said first-mentioned device but characterized by relatively smaller relative-moving influence on said members, for causing said mutual relationship to be predetermined in substantial accordance with the temperature of said first-mentioned device.

12. The combination according to claim 11, further including a third thermally displaceable device exposed to ambient temperature and arranged to annul the influence of ambient temperature on said second thermally displaceable device, whereby the temperature of said first-mentioned device according to which said mutual relationship is predetermined is caused to be the temperature of said first-mentioned device relative to ambient temperature.

13. In a control system, in combination, an electro-thermal device and means for supplying a heating current thereto, said device being characterized by a saturation displacement D; contacts and means operable to cause the heating of said device to close said contacts, the spacing between said contacts when said device is at ambient temperature being approximately $S_a$; and compensating means, effective while said closure-causing means is out of operation, for reducing said contact spacing by approximately $S_a/D$ times the displacement of said device from its ambient-temperature position.

14. In a control system, in combination, an electro-thermal device and means for supplying a heating current thereto, said device being characterized by a saturation displacement $D$; control means comprising relatively movable control members, and means operable to cause the heating of said device to operate said control means, said members being so related that their relative movement required for operation of said control means when said device is initially at ambient temperature is approximately $S_a$; and compensating means, effective while said operation-causing means is out of operation, for reducing the relative movement of said members required for operation of said control means by approximately $S_a/D$ times the displacement of said device from its ambient-temperature position.

15. In a control system, in combination, an electro-thermal device and means for supplying a heating current thereto; contacts and means operable to cause the heating of said device to close said contacts, the spacing between said contacts when said device is at ambient temperature being approximately $S_a$; and thermal compensating means, heated substantially proportionately with said device, for reducing said contact spacing when said device is at over-ambient temperature and said closure-causing means is out of operation, the saturation displacement of said thermal compensating means being approximately $S_a$.

16. In a control system, in combination, an electro-thermal device and means for supplying a heating current thereto; control means comprising relatively movable control members, and means operable to cause the heating of said device to operate said control means, said members being so related that their relative movement required for operation of said control means when said device is initially at ambient temperature is approximately $S_a$; and thermal compensating means, heated substantially proportionately with said device and effective when said device is at over-ambient temperature and said operation-causing means is out of operation, for reducing said required relative movement, the saturation displacement of said thermal compensating means being approximately $S_a$.

17. The combination according to claim 16, wherein the heat-loss constant of said thermal compensating means is substantially the same as the thermal constant of said device.

18. In a control system including control means comprising a pair of control members and operable by relative movement of said members: the combination of a thermal device which may be heated and which is adapted for displacement in accordance with temperature; means operable to cause the heating of said device to relatively move said control members; and means for reducing, by a fraction of the temperature-effected displacement of said device, the relative movement of said members required for operation of the control means.

CHARLES W. SLOCUM.
CHARLES T. JACOBS.